United States Patent [19]

Norton et al.

[11] 3,760,879

[45] Sept. 25, 1973

[54] PETROLEUM RECOVERY PROCESS UTILIZING FORMALDEHYDE-SULFITE-REACTED POLYACRYLAMIDE

[75] Inventors: Charles J. Norton; David O. Falk, both of Denver, Colo.

[73] Assignee: Marathon Oil Company, Findlay, Ohio

[22] Filed: Oct. 29, 1971

[21] Appl. No.: 193,740

[52] U.S. Cl............................. 166/275, 252/8.55 D
[51] Int. Cl............................................. E21b 43/20
[58] Field of Search................ 252/855 D; 166/274, 166/273, 275

[56] References Cited
UNITED STATES PATENTS 2,827,964  3/1958  Sandiford et al. ............. 252/8.55 X
3,020,953  2/1962  Zerweck et al..................... 166/274
3,085,063  4/1963  Turbak ........................... 252/8.55 X
2,761,834  9/1956  Suen et al. ..................... 260/79.3 X
3,039,529  6/1962  McKennon ..................... 252/8.55 X
3,580,337  5/1971  Gogarty .......................... 166/274 X Primary Examiner—Herbert B. Guynn
Attorney—Joseph C. Herring

[57] ABSTRACT

Viscosity and screen factor of modified polyacrylamides for use in supplemented recovery of petroleum are increased by treatment with formaldehyde and either simultaneously or sequentially with sulfite or bisulfite to yield a high molecular weight partially hydrolyzed sulfomethylated polyacrylamide which is hydrophilic and exhibits high efficiency in petroleum recovery.

7 Claims, 1 Drawing Figure

A LITTLE SULFOMETHYLATION AND CONCOMITANT
HYDROLYSIS GIVES A LARGE IMPROVEMENT OF
POLYACRYLAMIDE FOR OIL PRODUCTION.

® TRADEMARK MARATHON OIL COMPANY

PETROLEUM RECOVERY PROCESS UTILIZING FORMALDEHYDE-SULFITE-REACTED POLYACRYLAMIDE

CROSS REFERENCES TO RELATED APPLICATIONS

The following United States patent applications relate to the general field of the present invention: U.S. Pat. Ser. No. 193,986, filed Oct. 29, 1971.

BACKGROUND OF THE INVENTION

1. Field of the Invention

The present invention relates to the injection into formations of fluids comprising water classified in Class 166, subclasses −275 and −305 of the United States Patent Classification System.

2. Description of the Prior Art

A search for pertinent prior art has disclosed the following: *Industrial Engineering Chemistry*, 48, 2132–2137 which teaches treatment of acrylamide polymers with formalin and sodium bisulfite (or sodium sulfite) for reaction times of one to five hours at temperatures in the range of 20°–75° C. and suggests the resulting product as a soil conditioner or drilling mud additive, etc., but does not mentioned secondary recovery of petroleum; Davidson and Sittig, *Water Soluble Resins* (1968) on page 80 states that polyacrylamide reacts with formaldehyde to give methylolated polyacrylamide under alkaline conditions at room temperature; and further states that "an anionic derivative is obtained from the sulfomethylation of the [polyacrylamide] polymer with formaldehyde and sodium bisulfite at pH levels of 10 to 12. The product has been shown to be comparable to some of the commercial products used in drilling muds and soil conditioning." No mention is made of secondary recovery of petroleum; U.S. Pat. No. 2,761,834 teaches and claims reacting an acrylamide compound with formaldehyde and sulfurous acid compounds, e.g., sodium bisulfite; U.S. Pat. Ser. No. 117,692, filed Feb. 22, 1971 (by B. L. Knight), now abandoned teaches improved flooding with partially hydrolyzed, high molecular weight polyacrylamides effected by incorporating aldehyde, e.g., formaldehyde, as oxygen-scavenging agents in the polymer solution to obtain improved screen factors and minimum viscosity loss during secondary recovery operations; U.S. Pat. No. 3,085,063 teaches addition of 0.005–5 percent formaldehyde (Col. 8, lines 33–34) to reduce viscosity loss during viscous waterflooding using polymers, e.g., sulfonated polymers, copolymers of vinyl aromatics and maleic anhydride, polyethylene oxide or polypropylene oxide types, all of which have molecular weights above about 500,000. This patent does not mention polyacrylamides; U.S. Pat. No. 2,827,964 (Col. 2, lines 71–72) teaches "aldehydes" as bactericides in aqueous solutions containing partially hydrolyzed, high molecular weight polyacrylamides and used for recovery of petroleum. This patent does not mention reaction of the aldehydes with the polyacrylamides; U.S. Pat. No. 3,042,611 teaches waterflooding with dextran incorporating formaldehyde as a bactericide and stabilizer; U.S. Pat. No. 2,702,791 teaches formaldehyde as an oxidation inhibitor in tannin drilling fluid additive, apparently as an oxygen scavenger; U.S. Pat. No. 3,053,765 also teaches formaldehyde as a stabilizer in dextran solutions used for waterflooding; U.S. Pat. No. 2,761,834 teaches the product formed by reacting specific acrylamides and formaldehyde with a sulfurous acid compound at specific reaction ratios; various other patents dealing generally with acrylamides include: U.S. Pat. Nos. 2,680,110; 2,761,856; 2,909,508; and 3,021,298. Canadian Pat. No. 864,433 teaches polymers containing at least 5 percent by weight of repeating units of (N-sulfohydrocarbon-substituted acrylamide) (as viscosity increasing agents) for secondary oil recovery.

None of the above prior art teaches formaldehyde-sulfite reaction with high molecular weight unhydrolyzed polyacrylamide prior to use of the polymer to produce a randomly sulfomethylated and randomly partially hydrolyzed polyacrylamide as an improved viscosity agent and improved oil recovery agent.

SUMMARY OF THE INVENTION

GENERAL STATEMENT OF THE INVENTION

According to the invention, high molecular weight unhydrolyzed polyacrylamide is contacted with formaldehyde and either simultaneously or sequentially with inorganic sulfite to cause random sulfomethylation of the polyacrylamide polymer. This sulfomethylation has been discovered to improve the viscosity, the "screen factor" and the efficiency in recovery of oil in supplemented petroleum recovery processes. By "supplemented petroleum recovery processes" is meant primary, secondary or tertiary processes for the recovery of petroleum in which displacement fluids are injected into the formation to drive petroleum in place toward a production well. "Screen factor" is determined according to the techniques of Paper No. SPE 2,867 of the Society of Petroleum Engineers of the American Institute of Mining Engineers, which paper also describes the screen viscometer and screen factor discussed later in this application.

UTILITY OF THE INVENTION

The present invention, by increasing the viscosity, screen factor, and oil recovery efficiency, provides substantially improved efficiencies and economies when used as, or in connection with, displacement fluids for the recovery of petroleum from subterranean formations. In addition, the compositions and processes of the present invention can be utilized for the formulation of controlled density fluids, e.g., for ore flotation, liquid-solid separation processes.

BRIEF DESCRIPTION OF THE DRAWING

The drawing is a plot of the percent sulfomethylation (that is, the percent of the total amide groups in the high molecular weight polyacrylamide which have been substituted with sulfomethyl groups) versus the percent residual oil recovery when the aqueous solution of 500 ppm (partially hydrolyzed) sulfomethylated polyacrylamides are used to drive a slug of micellar system through a typical 3 inch diameter by 4 foot long Berea sandstone core prepared by previously saturating the core with oil and subsequently waterflooding to a residual oil saturation of about 30 to 40 percent of a pore volume).

DESCRIPTION OF THE PREFERRED EMBODIMENTS

Figure 1:
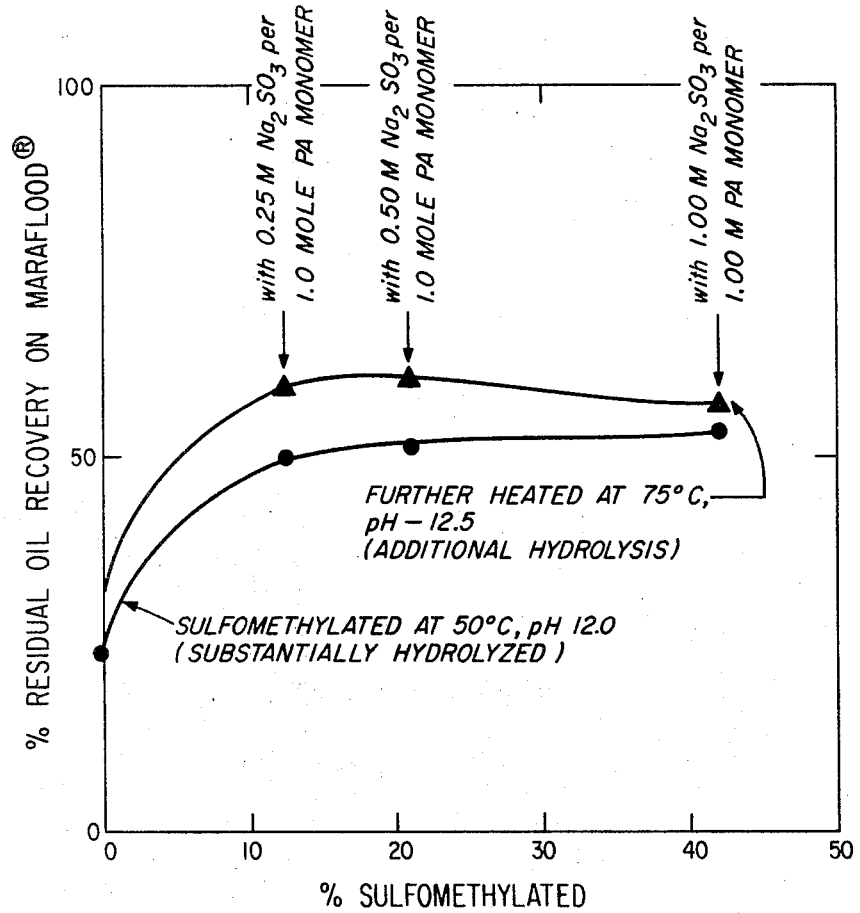

Starting Materials:

Unhydrolyzed Polyacrylamide: The polyacrylamide utilized with the present invention can be synthesized from acrylamide monomer or of commercial quality, e.g., that produced by Dow Chemical Company, by American Cyanamid Company, (described in their bulletin "Chemistry of Acrylamide"), or others, and should be unhydrolyzed. The molecular weight should preferably be in the range of from about 1 to about 100, more preferably from 2 to about 50, and most preferably from about 3 to about 12 million. The commercial grade is commonly a white flaky material which is readily solubilized in water, forming a clear water-white solution in water at room temperature.

For the purposes of the present invention, the aqueous solution should contain from about 50 to about 5,000, more preferably from about 100 to about 2,000, and most preferably from about 200 to about 1,500 parts per million by weight of unhydrolyzed polyacrylamide. High-shear mixing should be avoided as it may cause rupture of the molecule reducing effective molecular weight and viscosity increasing properties.

Water: Water will preferably be fresh water but can be brackish or slightly saline, e.g., as in Palestine water. In some situations, there may be some advantages in partial treatment of the water to remove deleterious impurities.

Formaldehyde: The formaldehyde can be in the form of a liquid solution (formalin) preferably containing from about 37 percent by weight formaldehyde which is the normal commercially available strength. The percent by weight of formaldehyde in the solution is not narrowly critical and can be adjusted to give the desired dilution of the end product, polyacrylamide/formaldehyde aqueous solution. The formaldehyde can can be in a gaseous form and bubbled directly into the aqueous solution of unhydrolyzed polyacrylamide. Also, paraformaldehyde can be employed either by heating to form gaseous formaldehyde or by dissolving directly into the aqueous solution of unhydrolyzed polyacrylamide.

Preferably from about 0.01 to about 10.0, more preferably from about 0.1 to about 5, and most preferably from about 0.5 to about 2 moles of formaldehyde per mole of acrylamide monomer unit in the polyacrylamide will be used in the invention.

Sulfites: The sulfites for use with the present invention will be inorganic sulfites, including ammonium sulfite which acts as an inorganic sulfite. "Sulfites" also includes bisulfites and metabisulfites. Sodium sulfite or bisulfite is a preferred source of sulfite ion. However, any non-interfering compound which forms bisulfite or sulfite ions in the reaction mixture may be utilized. By "non-interfering bisulfites" is meant those bisulfite-forming compounds which do not cause undesirable side reactions including among others: alkali sulfites, alkaline earth sulfites, alkali bisulfites, alkaline earth bisulfites, ammonium sulfite, ammonium bisulfite, the corresponding pyrosulfites and metabisulfites. Preferably from about 0.01 to about 2.0, more preferably from about 0.05 to about 1, most preferably from about 0.1 to about 0.5 moles of sulfite per mole of acrylamide monomer unit in the polyacrylamide will be used in the invention.

pH Control in formaldehyde treatment step: It has been discovered that the reaction is greatly enhanced by being conducted at a pH within the range of from about 7.5 to about 11, more preferably from 8.0 to about 10.5, and most preferably from 10 to about 10.5. The pH range can be readily achieved by the use of buffers, e.g., trisodium phosphate, triethanolamine, sodium bicarbonate-carbonate, boric acid-borate, and borax.

pH control in sulfite treatment step: It has been discovered that the reaction with sulfite is most desirably conducted at a pH within the range of from about 9 to about 14, more preferably from about 9.5 to about 13.5, and most preferably from about 10 to about 13. The pH range can readily be achieved by the use of buffers, e.g. trisodium phosphate, sodium polyphosphate, triethanolamine, sodium bicarbonate-sodium carbonate, boric acid-borate, and borax. Addition of the sulfite will itself increase the pH to within the preferred range, i.e., to approximately 12. But the addition of buffer is desirable to assist in maintaining the pH during the sulfite reaction.

Temperature in both steps: While not narrowly critical, the reaction between the formaldehyde and the unhydrolyzed polyacrylamide will preferably be conducted in the range of from about 0° to about 300° C., more preferably from about 20° to about 200° C. and most preferably from about 30° to about 100° C. The most optimal temperature for the formaldehyde addition has been found to be approximately 50° C. The contacting of the unhydrolyzed polyacrylamide with the sulfite will preferably occur at about 0° to about 300° C., more preferably 20° to 200° C., and most preferably 30° to 100° C. The most optimal temperature for the sulfite addition has been found to be about 75° C. However, as stated above, the sulfite treatment can be conducted simultaneously with the formaldehyde treatment.

Pressure: Pressure in both steps may vary widely, but will, in most cases, be conveniently near atmospheric pressure. However, where higher temperatures are to be used, additional pressure may be imposed above the reaction mixture, e.g., by the use of inert gases or by the use of compressed air in order to prevent boiling or excessive evaporation of water.

Time: Reaction time for each step (or for the combined step where formaldehyde and sulfite treatments are carried on simultaneously) is also not narrowly critical and may be in the range of from about 0.1 to about 100 hours, more preferably from about 0.5 to about 50 hours, and most preferably from about 1 to about 10 hours.

Batch or Continuous Basis: While the examples below describe the invention on a batch basis, it may, of course, be practiced on a continuous basis with continuous flows of starting materials into the reactor.

Partial Hydrolysis: An important feature of the present invention is that the residual unhydrolyzed acrylamide units in the methylolated polymer are partially hydrolyzed during the treatment with sulfite. While the degree of hydrolysis is not precisely determined by available analytical techniques, it is estimated to be within the range of from about 5 to 70 percent hydrolysis of the amide groups which have not been reacted with the sulfite. This partial hydrolysis greatly increases the polarity of the molecule in the finished product, and the sulfomethylation further increases this polarity. The resultant molecule polar groups on the polymer tend to strongly repel each other, providing excellent dispersibility and major increase in viscosity and screen factor even in relatively dilute solutions. It is particularly important that these sulfomethylated products of the present invention have been demonstrated to maintain their high viscosity and screen factor even in the presence of calcium ions. Calcium ions are often encountered in the subterranean formations which contain oil and are known to be deleterious to conventional viscosity and screen factor-increasing agents including unmodified partially hydrolyzed high molecular weight polyacrylamides.

Reaction Equations: While it should be understood that the present invention is not to be confined to any particular hypothesis, it is believed that the principal course of the reaction is described by the following equations:

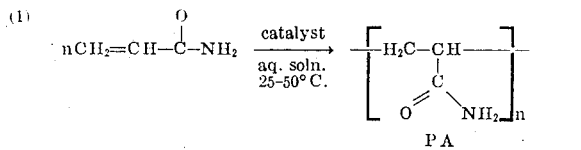

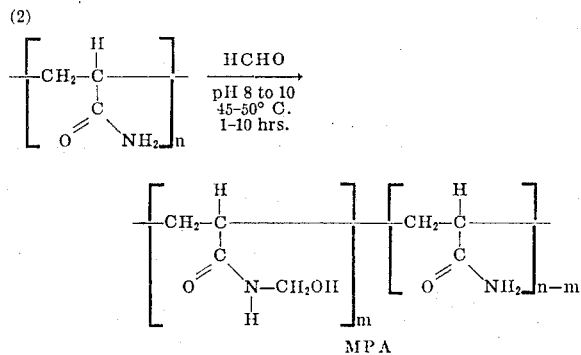

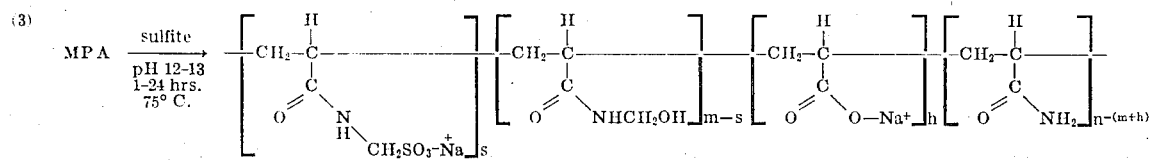

where $n$ is the number of average moles polymerized, $m$ moles methylolated, $s$ moles sulfitated, and $h$ moles hydrolyzed as determined by analysis.

EXAMPLES

EXAMPLES I – III

For the following examples, 12.7725 grams of acrylamide are dissolved in 500 ml deionized water to give an aqueous solution having a monomer concentration of 0.36 moles per liter. The reaction chamber was purged with nitrogen to remove oxygen. The temperature was adjusted to room temperature, approximately 22° C. There was then added 0.01 grams of ammonium persulfate in 500 ml deionized water, 0.03 grams triethanolamine, and the reaction was permitted to continue for 70 hours, after which time the polymerization was substantially complete.

For the methylolation step, 100 ml of the above polymerization reaction solution (without purification) are diluted to 500 ml with deionized water to provide a solution having a pourable viscosity. The pH is adjusted in the range of 10 – 10.5 with trisodium phosphate and the temperature is adjusted to 45° – 50° C. 7.0 ml of 37 percent formaldehyde solution are added and the reaction is permitted to continue for 4.0 hours.

Utilizing the gross reaction mixture produced above, the pH is adjusted to 11.5 with trisodium phosphate and the temperature kept at 45°–50° C. 1.3297 grams of sodium sulfite (as aqueous solution) are added and the reaction is permitted to continue for 5.0 hours at pH in the range of 12–13 after the sulfite addition and the temperature is adjusted to 75° C. during the reaction.

The gross reaction mixture, about 200 ml, from the above sulfomethylation reaction product is utilized by dilution with about 2,300 ml Palestine water and to a viscosity of approximately 11.8 cp, and used to produce the results described below.

Table 1 summarizes a core flood experiment contrasting the effectiveness of unmodified, unhydrolyzed polyacrylamide (Eample I) with methylolated unhydrolyzed polyacrylamide (Example II) with sulfomethylated hydrolyzed polyacrylamide (Example III) produced according to the present invention in a tertiary waterflood carried out in a Berea sandstone core which is previously loaded with Henry brine (1,000 ppm $Cl^-$, 6,500 ppm $Na^+$, 276 ppm $Ca^{++}$, 167 ppm $Mg^{++}$) and Henry crude oil to the oil initial level ($O_i$) and initial water level ($W_i$). The cores are then subsequently primary waterflooded with Henry brine to residual saturation ($O_r$ and $W_r$) and then flooded with thickened synthetic Palestine water containing 500 ppm thickener, 400 ppm NaCl, and 55 ppm $CaCl_2$.

The core data indicates that the pore volumes and porosities during the runs were nearly identical. Despite some differences in permeabilities between the cores, the results fairly demonstrate the abilities of the aqueous solutions produced according to the present invention as compared to the conventional unhydrolyzed polyacrylamide solutions and as compared to the methylolated unhydrolyzed polyacrylamide produced according to our copending U.S. Pat. application Ser. No. 193,986, filed Oct. 29, 1971. Note that the comparative waterflood gives closely comparable initial water and oil saturations and residual oil and water saturations as well as efficiencies of primary waterflood oil recovery. The subsequent secondary thickened waterflood is conducted with synthetic Palestine brine containing 400 ppm sodium chloride, 55 ppm calcium chloride and 500 ppm of the respective polymeric thickener. Note that the final tertiary recovery of oil is more than twice as great with the compositions of the present invention as with conventional unhydrolyzed polyacrylamide.

TABLE 1.—SUMMARY OF THICKENED WATERFLOODS WITH POLYACRYLAMIDE METHYLOLATED PRODUCT, AND SULFOMETHYLATED PRODUCT

| Example | Run No. | Core data | | | Preparative waterflood [1] percent | | | | | Thickener, 500 p.p.m. | Total thickened water recovery [2] | |
|---|---|---|---|---|---|---|---|---|---|---|---|---|
| | | PV, ml. | Porosity, percent | Permeability, md. | $O_i$ | $W_i$ | $O_r$ | $W_r$ | Eff. | | PV | Percent of $O_r$ |
| I | 10,011 | 1,041 | 20.2 | 395.9 | 62.6 | 37.4 | 36.1 | 63.9 | 42.3 | Polyacrylamide | 0.924 | 5.3 |
| II | 10,012 | 1,029 | 20.0 | 335.1 | 60.4 | 39.6 | 34.5 | 65.5 | 42.9 | Methylolated polyacrylamide | 0.944 | 8.1 |
| III | 10,013 | 1,025 | 19.9 | 307.2 | 57.9 | 42.1 | 33.2 | 66.8 | 42.7 | Sulfomethylated polyacrylamide | 0.945 | 12.4 |

[1] 4 ft. x 3 in. Berea fired at 825° F., saturated with Henry brine (11,000 p.p.m. Cl⁻, 6,500 p.p.m. Na⁺, 276 p.p.m. Ca⁺⁺, 167 p.p.m. Mg⁺⁺) and Henry Crude to oil initial ($O_i$) and water ($W_i$); subsequently water-flooded to residual saturations ($O_r$ and $W_r$) and then flooded with synthetic "Palestine Water" containing 400 p.p.m. NaCl, 55 p.p.m. CaCl₂ and thickener.
[2] After flooding with approximately 1 pore volume of thickened synthetic "Palestine Water."

TABLE 2.—SUMMARY OF THICKENED WATER MICELLAR SYSTEM SLUGS WITH POLYACRYLAMIDE, METHYLOLATED PRODUCT, AND SULFOMETHYLATED PRODUCT

| Examples | Run No. | Core data | | | Preparative water flood, percent | | | | | Thickener, 500 p.p.m. | Total thickened water recovery [1] | |
|---|---|---|---|---|---|---|---|---|---|---|---|---|
| | | PV, ml. | Porosity, percent | Permeability, md. | $O_i$ | $W_i$ | $O_r$ | $W_r$ | Eff. | | PV | Percent of $O_r$ |
| IV | 11,016 | 1,071 | 20.8 | 410.6 | 61.3 | 38.7 | 36.5 | 63.5 | 40.5 | Polyacrylamide | 1.052 | 27.7 |
| V | 11,015 | 1,043 | 20.3 | 346.3 | 61.1 | 38.9 | 33.7 | 66.3 | 44.8 | Methylolated polyacrylamide | 1.069 | 45.8 |
| VI | 11,014 | 1,052 | 20.4 | 398.4 | 61.8 | 38.2 | 35.7 | 64.3 | 42.2 | Sulfomethylated polyacrylamide | 0.997 | 61.1 |

[1] Base on weighed amount of polyacrylamide used or reacted.

TABLE 3.—SUMMARY OF THICKENED WATER MARAFLOODS

| Examples | Run No. | Core data | | | Preparative water flood, percent | | | | | Thickener,[1] p.p.m. | Total thickened water recovery | |
|---|---|---|---|---|---|---|---|---|---|---|---|---|
| | | PV, ml. | Porosity, percent | Permeability, md. | $O_i$ | $W_i$ | $O_r$ | $W_r$ | Eff. | | PV | Percent of $O_r$ |
| A. Unthickened Palestine Water pushing 0.03 PV micellular slug, for comparison: | | | | | | | | | | | | |
| VII | 04109 | 1,004 | 19.5 | 345.2 | 60.8 | 39.2 | 36.2 | 63.8 | 40.5 | Unthickened Palestine water | 0.907 / 1.126 | 24.3 / 27.9 |
| B. Sulfomethylated thickener prepared at 50° C. and pH 12.0 pushing 0.03 PV micellular slug: | | | | | | | | | | | | |
| VIII | 03120 | 1,048 | 20.3 | 355.9 | 61.6 | 38.9 | 36.1 | 63.9 | 41.0 | 500 p.p.m. PA 12.75% sulfomethylated [2]. | 0.907 | 50.1 |
| IX | 03121 | 1,048 | 20.3 | 412.9 | 62.4 | 37.6 | 37.4 | 62.6 | 40.1 | 500 p.p.m. PA 21.0% sulfomethylate. | 0.968 | 51.9 |
| X | 03122 | 1,043 | 20.3 | 435.8 | 61.2 | 38.8 | 36.8 | 63.2 | 39.8 | 500 p.p.m. PA 42.0% sulfomethylated. | 0.961 | 54.4 |
| C. Sulfomethylated thickener further heated at 75° C. and pH 12.5 pushing 0.03 PV micellular slug[3]: | | | | | | | | | | | | |
| XI | 04106 | 1,038 | 20.2 | 387.5 | 62.6 | 37.4 | 36.5 | 63.5 | 41.7 | 500 p.p.m. PA, 12.75% sulfonated and further hydrolyzed. | 1.103 | 59.6 |
| XII | 04107 | 1,010 | 19.6 | 423.2 | 62.0 | 38.0 | 36.2 | 63.8 | 41.6 | 500 p.p.m. PA, 21.0% sulfomethylated to further hydrolyzed. | 1.114 | 60.9 |
| XIII | 04108 | 1,037 | 20.1 | 359.1 | 60.8 | 39.2 | 36.1 | 63.9 | 40.7 | 500 p.p.m. PA, 42.0% sulfomethylated and further hydrolyzed. | 1.079 | 57.0 |

[1] Base on weighed amount of polyacrylamide used or reacted.
[2] Sulfomethylated determined by iodometric titration procedure of Suen & Schiller.
[3] Further heating at higher pH effects more extensive hydrolysis of unreacted amide groups in polymer.

EXAMPLES IV – VI

To illustrate the advantages of the invention as a drive fluid utilized with a "leading edge" of micellar system slug, the following runs are conducted. The polymers are substantially identical with those utilized in Examples I–III. The results are as shown in Table 2.

Note that the compositions of the present invention gives recoveries which are better than twice as great as those of the conventional unhydrolyzed polyacrylamide and substantially greater than those of the methylolated polyacrylamides, illustrating the superiority of the compositions of the present invention when used as drive fluids for micellar system slugs in supplemented petroleum recovery operations.

EXAMPLES VII – XIII

Table 3 shows the tabulated data which is illustrated in the drawing. As can be seen from the table, or the drawing, approximately 10 percent sulfomethylation is optimum, since further sulfomethylation actually gives somewhat reduced oil recovery.

MODIFICATIONS OF THE INVENTION

It should be understood that the invention is capable of a variety of modifications and variations which will be made apparent to those skilled in the art by a reading of the specification and which are to be included within the spirit of the claims appended hereto.

For example, in some applications the thickeners disclosed above may be used as mixtures with each other or with thickeners of distinctly different chemical structures such as polyethylene oxide, polyvinylpyrrolidones, and polyvinyl carboxylates. In some cases, the thickener may be incorporated into the surfactant slug itself.

Also, the concentrations of unhydrolyzed polyacrylamides discussed under "Description of the Preferred Embodiments" should be understood to refer to concentration during the injection step. Where desired, the contact between formaldehyde and sulfite and polyacrylamide may be conducted at higher concentrations with subsequent dilution prior to or during injection.

What is claimed is:

1. In a process for the secondary or tertiary recovery of petroleum from formations by injecting aqueous solutions of viscosity-increasing compositions comprising aqueous solutions derived from unhydrolyzed polyacrylamides, the improvement comprising contacting said aqueous solutions of unhydrolyzed polyacrylamide having a molecular weight in the range of from about 1 to about 100 million at from about 0° to about 300° C. with from about 0.01 to about 10.0 moles of formaldehyde per mole of acrylamide monomer units contained within said polyacrylamide and contacting said unhydrolyzed polyacrylamide with from about 0.01 to about 2.0 moles of a sulfite selected from the group consisting of ammonium sulfites, ammonium bisulfites, alkali sulfites, alkali bisulfites, alkaline earth sulfites, and alkaline earth bisulfites, for each mole of acrylamide monomer units contained in said polyacrylamide to form a sulfomethylated polyacrylamide and injecting said aqueous solutions in a well to displace petroleum from said formations.

2. The process of claim 1 wherein said aqueous solutions of unhydrolyzed polyacrylamide are contacted with said formaldehyde at a temperature of from about 0° to about 300° C. and wherein said unhydrolyzed polyacrylamide is contacted with said sulfite at from about 0° to about 300° C.

3. A process according to claim 1 wherein said unhydrolyzed polyacrylamide in first contacted with said formaldehyde for a time sufficient to substantially complete said reaction with said formaldehyde and wherein said unhydrolyzed methylolated polyacrylamide is thereafter contacted with sulfite.

4. A process according to claim 1 wherein said unhydrolyzed polyacrylamide is contacted with said formaldehyde and said sulfite substantially simultaneously.

5. A process according to claim 1 wherein the aqueous solution contains from about 50 to about 5,000 parts per million by weight of unhydrolyzed polyacrylamide, said unhydrolyzed polyacrylamide having a molecular weight in the range of from about 1 to about 100 million, the sulfite is selected from the group consisting of: alkali sulfites, alkaline earth sulfites, alkali bisulfites, alkaline earth bisulfites, ammonium sulfite, ammonium bisulfite, the pyrosulfites and metabisulfites corresponding to any of the foregoing and mixtures of any of the foregoing, and wherein there are present from about 0.01 to about 10.0 moles of formaldehyde and from about 0.01 to about 2.0 moles of sulfite per mole of acrylamide monomer unit in the polyacrylamide, and wherein the temperature is in the range of from about 0° to about 300° C., and the contact is maintained for a reaction time of from about 0.1 to about 100 hours.

6. A process according to claim 3 wherein the aqueous solution contains from about 50 to about 5,000 parts per million by weight of unhydrolyzed polyacrylamide, the sulfite is selected from the group consisting of: alkali sulfites, alkaline earth sulfites, alkali bisulfites, alkaline earth bisulfites, ammonium sulfite, ammonium bisulfite, the pyrosulfites and metabisulfites corresponding to any of the foregoing and mixtures of any of the foregoing, and wherein there are present from about 0.01 to about 10 moles of formaldehyde and from about 0.01 to about 2.0 moles of sulfite per mole of acrylamide monomer unit in the polyacrylamide, and wherein the temperature is in the range of from about 0° to about 300° C., and each contact is maintained for a reaction time of from about 0.1 to about 100 hours.

7. A process according to claim 5 in which the aqueous solution contains from about 100 to about 2,000 parts per million by weight of unhydrolyzed polyacrylamide, said unhydrolyzed polyacrylamide has a molecular weight in the range of from about 1 to about 100 million, there are present from about 0.1 to about 5.0 moles of formaldehyde and about 0.05 to about 1.0 mole of sulfite per mole of acrylamide monomer unit within the polyacrylamide, the pH during the contact with the formaldehyde is in the range of from about 8.0 to about 10.5, the pH during the contact with sulfite is in the range of from about 9.5 to about 13.5, the temperature during the contact with formaldehyde and with sulfite is in the range of from about 20° to about 200° C., and the reaction is carried out for about 0.5 to about 50 hours.

* * * * *

UNITED STATES PATENT OFFICE
CERTIFICATE OF CORRECTION

Patent No. 3,760,879  Dated September 25, 1973

Inventor(s) Charles J. Norton et al.

It is certified that error appears in the above-identified patent and that said Letters Patent are hereby corrected as shown below:

Column 5, equation (3) should read as follows:

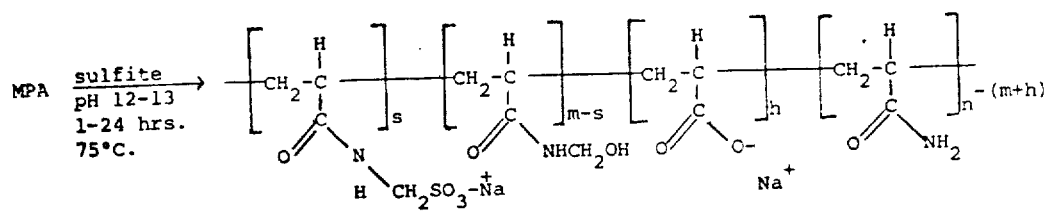

Column 6, line 21          (Eample I) should read --(Example I)

Column 7, Table 3, Example VIII Delete 61.6 and insert --61.1--

Column 9, line 33          Delete "in first" and insert --is first--

Signed and Sealed this

Eleventh Day of April 1978

[SEAL]

Attest:

RUTH C. MASON
Attesting Officer

LUTRELLE F. PARKER
Acting Commissioner of Patents and Trademarks